(12) United States Patent
Kazmi et al.

(10) Patent No.: US 10,764,009 B2
(45) Date of Patent: Sep. 1, 2020

(54) METHODS AND DEVICES FOR ACQUIRING SYSTEM INFORMATION

(71) Applicant: Telefonaktiebolaget LM Ericsson (publ), Stockholm (SE)

(72) Inventors: Muhammad Kazmi, Sundbyberg (SE); Imadur Rahman, Sollentuna (SE); Iana Siomina, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 17 days.

(21) Appl. No.: 16/329,543

(22) PCT Filed: Oct. 30, 2017

(86) PCT No.: PCT/SE2017/051064
§ 371 (c)(1),
(2) Date: Feb. 28, 2019

(87) PCT Pub. No.: WO2018/084777
PCT Pub. Date: May 11, 2018

(65) Prior Publication Data
US 2019/0229954 A1 Jul. 25, 2019

Related U.S. Application Data

(60) Provisional application No. 62/417,615, filed on Nov. 4, 2016.

(51) Int. Cl.
*H04L 5/00* (2006.01)
*H04L 5/14* (2006.01)
(Continued)

(52) U.S. Cl.
CPC ............ *H04L 5/0048* (2013.01); *H04L 5/001* (2013.01); *H04L 5/005* (2013.01); *H04L 5/0055* (2013.01);
(Continued)

(58) Field of Classification Search
CPC ....... H04L 5/001; H04L 5/0048; H04L 5/005; H04L 5/0055; H04L 5/0098;
(Continued)

(56) References Cited

U.S. PATENT DOCUMENTS

2009/0109908 A1* 4/2009 Bertrand ............... H04L 5/0051
370/329
2013/0114537 A1* 5/2013 Lee ..................... H04W 74/002
370/329

(Continued)

OTHER PUBLICATIONS

Qualcomm Incorporated, "Details for SRS and PRACH switching and transmission" R1-1609983, 3GPP TSG RAN WG1 Meeting #86bis Lisbon, Portugal Oct. 10-14, 2016 (Year: 2016).*
(Continued)

*Primary Examiner* — Gary Mui
(74) *Attorney, Agent, or Firm* — Coats + Bennett, PLLC

(57) ABSTRACT

A method for a wireless device, a wireless device, a method for a network node, and a network for acquiring system information, SI, during sounding reference signals, SRS, carrier based switching, are provided. First it is determined a need for performing SRS carrier based switching from a first cell, cell1, operating on a first carrier frequency, F1, to a second cell, cell2, operating on a second carrier frequency, F2. Secondly a system information, SI, of a third cell, cell3, on a third carrier frequency, F3, during a time period, T1 is acquired.

17 Claims, 8 Drawing Sheets

(51) Int. Cl.
  *H04L 25/02* (2006.01)
  *H04W 72/04* (2009.01)
(52) U.S. Cl.
  CPC .......... *H04L 5/0098* (2013.01); *H04L 5/1469* (2013.01); *H04L 25/0226* (2013.01); *H04W 72/0446* (2013.01); *H04W 72/0453* (2013.01)
(58) Field of Classification Search
  CPC ............. H04L 5/1469; H04L 25/0226; H04W 72/0446; H04W 72/0453
  See application file for complete search history.

(56) References Cited

U.S. PATENT DOCUMENTS

| | | | | |
|---|---|---|---|---|
| 2014/0112180 | A1* | 4/2014 | Axmon | H04W 24/10 370/252 |
| 2017/0324528 | A1* | 11/2017 | Rico Alvarino | H04L 5/14 |
| 2017/0332370 | A1* | 11/2017 | Rico Alvarino | H04L 5/0048 |
| 2018/0007707 | A1* | 1/2018 | Rico Alvarino | H04L 5/0096 |
| 2019/0165908 | A1* | 5/2019 | Takeda | H04W 8/22 |
| 2019/0260487 | A1* | 8/2019 | Kazmi | H04L 5/0048 |

OTHER PUBLICATIONS

Qualcomm Incorporated, "Collision handling" R1-1609985, 3GPP TSG RAN WG1 Meeting #86bis Lisbon, Portugal Oct. 10-14, 2016 (Year: 2016).*

Samsung, "SRS Collision due to Carrier Switching"; R1-164788; 3GPP TSG RAN WG1 #85 Nanjin, China, May 23-27, 2016 (Year : 2016).*

Huawei, HiSilicon, "Discussion on SRS carrier based switching"; R4-162440, 3GPP TSG-RAN WG4 Meeting #78bis San Jose del Cabo, MX Apr. 11-15, 2016 (Year: 2016).*

Ericsson, "Requirements with SRS carrier based switching", 3GPP TSG-RAN WG4 Meeting #81, Reno, Nevada, USA, Nov. 14, 2016, pp. 1-57, R4-1610422, 3GPP.

Huawei, "Details on collision handling for SRS carrier based switching", 3GPP TSG-RAN WG1 Meeting #86, Gothenburg, Sweden, Aug. 22, 2016, pp. 1-3, R1-166132, 3GPP.

Huawei et al., "Support for SRS switching among TDD Scells", 3GPP TSG-RAN WG2 Meeting #91bis, Malmo, Sweden, Oct. 5, 2015, pp. 1-5, R2-154344, 3GPP.

Ericsson, "PUCCH in SRS carrier switching", 3GPP TSG-RAN WG1#86bis, Lisbon, Portugal, Oct. 10, 2016, pp. 1-2, R1-1609687, 3GPP.

Ericsson, "On SRS switching and SI reading", 3GPP TSG RAN WG4 Meeting #82, Athens, Greece, Feb. 13, 2017, pp. 1, R4-1701840, 3GPP.

3rd Generation Partnership Project, "3rd Generation Partnership Project; Technical Specification Group Radio Access Network; Evolved Universal Terrestrial Radio Access (E-UTRA); Requirements for support of radio resource management (Release 14)", Technical Specification, 3GPP TS 36.133 V141.0, Sep. 1, 2016, pp. 1-2226, 3GPP.

* cited by examiner

METHODS AND DEVICES FOR ACQUIRING SYSTEM INFORMATION

TECHNICAL FIELD

The present invention generally relates to communication networks and particularly relates to acquiring system information (SI) during sounding reference signals (SRS) carrier based switching.

BACKGROUND

Sounding reference signals (SRS) are signals that are transmitted by UEs to, e.g., allow the eNodeB to estimate different uplink-channel properties. These estimates may be used for uplink scheduling and link adaptation but also for downlink multiple antenna transmission, especially in case of TDD where the uplink and downlink use the same frequencies. The SRS are defined in FIG. 1 and have time duration of a single OFDM symbol.

SRS can be transmitted in the last symbol of a 1 ms uplink subframe, and for TDD, the SRS can also be transmitted in the special slot, UpPTS. The length of UpPTS can be configured to be one or two symbols. In FIG. 2 an example is illustrated for TDD.

The configuration of SRS symbols, such as SRS bandwidth, SRS frequency domain position, SRS hopping pattern and SRS subframe configuration are set semi-statically as a part of RRC information element.

There are two types of SRS transmission in LTE UL, periodic and aperiodic SRS transmission. Periodic SRS is transmitted at regular time instances as configured by means of RRC signaling. Aperiodic SRS is one shot transmission that is triggered by signaling in PDCCH.

There are in fact two different configurations related to SRS
  Cell specific SRS configuration
  UE specific configuration.
The cell specific configuration indicates what subframes may be used for SRS transmissions within the cell, as illustrated in FIG. 2.
The UE specific configuration indicates to the terminal a pattern of subframes (among the subframes reserved for SRS transmission within the cell) and frequency domain resources to be used for SRS transmission of that specific UE. It also includes other parameters that the UE shall use when transmitting the signal, such as frequency domain comb and cyclic shift.

This means that SRS from different UEs can be multiplexed in the time domain, by using UE-specific configurations such that the SRS of the two UEs are transmitted in different subframes. Furthermore, within the same symbol, sounding reference signals can be multiplexed in the frequency domain. The set of subcarriers is divided into two sets of subcarriers, or combs with the even and odd subcarriers in each such set. Additionally, UEs may have different bandwidths to get additional FDM. (The comb enables frequency domain multiplexing, or FDM, of signals with different bandwidths and also overlapping). Additionally, code division multiplexing can be used. Then different users can use the same time and frequency domain resources by using different shifts of a basic base sequence.

In LTE networks, there are many kinds of downlink heavier traffic, which leads to a larger number of aggregated downlink component carriers (CC) than the number of (aggregated) uplink CCs. For the existing UE categories, the typical carrier aggregation (CA) capable UEs only support one or two uplink CCs while up to 5 CCs can be aggregated in DL in Rel-14 timeframe. A larger number of CCs will be supported in future 3GPP releases.

SRS carrier based switching is aiming to support SRS switching to and between TDD component carrier(s), where the component carriers available for SRS transmission correspond to the component carriers available for carrier aggregation of PDSCH, while the UE has fewer component carriers available for carrier aggregation of PUSCH.

SRS carrier based switching is applicable to at least the following CA scenarios:
  Both TDD-TDD and FDD-TDD CA scenarios are included for SRS carrier based switching.
  Both inter-band and intra-band cases and mixtures of these two cases for TDD-TDD and FDD-TDD can be considered for SRS carrier based switching.

Some of the TDD carriers with DL transmission for the UE will have no UL transmission including SRS, and channel reciprocity cannot be utilized for these carriers. Such situations will become more severe with CA enhancement of up to 32 CCs where a large portion of CCs might be TDD. Allowing fast carrier switching to and between TDD UL carriers can be a solution to allow SRS transmission on these TDD carriers so that corresponding reciprocity benefits can be harvested in DL.

Thus, SRS carrier based switching herein means that during certain time resources the UE does not transmit any signal on one carrier (e.g. F1) while it transmits uplink reference signals (e.g. SRS) on another carrier (e.g. F2). To perform SRS switching, the UE uses the radio circuitry (e.g. transmitter chain) of one carrier to transmit SRS on a cell of another carrier. This operation may cause interruption on one or more cells serving the UE. As an example, F1 and F2 can be PCell carrier and SCell carrier respectively, or both of them can be SCells carriers.

In E-UTRAN the serving cell can request the UE to acquire the cell global identifier (CGI) of a cell, which uniquely identifies the cell. To acquire the CGI of the cell, the UE must read at least part of the system information (SI) including master information block (MIB) and the relevant system information block (SIB) of that cell. The reading of SI for the acquisition of CGI is carried out during measurement gaps which are autonomously created by the UE i.e. gaps that are not configured by the network node rather left for the UE to create. The CGI or SI or ECGI is also considered to be a UE measurement, which the UE may also report to the network node.

In LTE the UE reads the MIB and SIB1 of the target cell E-UTRAN cell to acquire its CGI (aka ECGI when the target cell is E-UTRAN intra- or inter-frequency).

In LTE the MIB includes a limited number of most essential and most frequently transmitted parameters that are needed to acquire other information from the cell, and is transmitted on BCH. In particular the following information is currently included in MIB: DL bandwidth, PHICH configuration, and system frame number (SFN).

The MIB is transmitted periodically with a periodicity of 40 ms and repetitions made within 40 ms. The first transmission of the MIB is scheduled in subframe #0 of radio frames for which the SFN mod 4=0, and repetitions are scheduled in subframe #0 of all other radio frames.

In LTE the SIB1 contains at least the following information, PLMN identity, cell identity, CSG identity and indication, frequency band indicator, SI-window length, scheduling info for other SIBs etc.

The LTE SIB1, as well as other SIB messages, is transmitted on a physical channel, PDSCH. The SIB1 is transmitted with a periodicity of 80 ms and repetitions made within 80 ms. The first transmission of SystemInformationBlockType1 is scheduled in subframe #5 of radio frames for which the SFN mod 8=0, and repetitions are scheduled in subframe #5 of all other radio frames for which SFN mod 2=0.

The UE receives request from the network node to acquire CGI of a target cell as indicated by its PCI. The UE receives measurement configuration or an assistance data/information, which is a message or an information element (IE) sent by the network node (e.g. serving eNode B, positioning node etc) to configure UE to perform the requested measurements. The UE therefore first synchronizes to the target cell and acquire PCI of the target cell. The UE then creates autonomous gaps for acquiring automatic gain control (AGC), for reading initial transmissions and repetitions of MIB and SIB1.

The SRS carrier based switching causes interruptions in one or more serving cells of the UE. The interruption may affect a measurement procedure during which the UE is acquiring system information (SI) of a target cell. The interruptions may on one hand result in the UE prematurely aborting the SI acquisition procedure. This will degrade the mobility performance and/or Self-Organizing Networks (SON) operation which relies on CGI of the target cell. Another consequence is that the UE may create more autonomous gaps leading to more interruption for the serving cell. This will degrade the serving cell reception and/or transmission performance for the UE configured to acquire the SI of the target cell.

The approaches described in the Background section could be pursued, but are not necessarily approaches that have been previously conceived or pursued. Therefore, unless otherwise indicated herein, the approaches described in the Background section are not prior art to the claims in this application and are not admitted to be prior art by inclusion in the Background section.

SUMMARY

In certain embodiments a method for a wireless device for acquiring system information, SI, during sounding reference signals, SRS, carrier based switching, is provided. The method includes determining a need for performing SRS carrier based switching from a first cell, cell1, operating on a first carrier frequency, F1, to a second cell, cell2, operating on a second carrier frequency, F2. The method further includes acquiring a system information, SI, of a third cell, cell3, on a third carrier frequency, F3, during a time period, T1. Furthermore, the method includes transmitting a minimum number of uplink feedback signals in the first cell, cell1, in response to receiving downlink data in the first cell, cell1, where the minimum number of uplink feedback signals in the first cell, cell1, is dependent on whether SRS switching causes interruption on first cell, cell1.

In certain embodiments a wireless device configured for operation in a wireless communication network comprising at least a network node, a first cell, a second cell, and a third cell, and for acquiring system information, SI, during sounding reference signals, SRS, carrier based switching is provided. The wireless device includes a radio transceiver circuitry configured to send signals to the wireless communication network and to receive signals from the wireless communication network and processing circuitry operatively associated with the radio transceiver circuitry, and configured to determine a need for performing SRS carrier based switching from a first cell, cell1, operating on a first carrier frequency, F1, to a second cell, cell2, operating on a second carrier frequency, F2. The processing circuitry is further configured to acquire a system information, SI, of a third cell, cell3, on a third carrier frequency, F3, during a time period, T1, and to transmit a minimum number of uplink feedback signals in the first cell, cell1, in response to receiving downlink data in the first cell, cell1, where the minimum number of uplink feedback signals in the first cell, cell1, is dependent on whether SRS switching causes interruption on first cell, cell1.

In certain embodiments a method for a network node, connected to a wireless device in wireless communication network, for system information, SI, handling during sounding reference signals, SRS, carrier based switching is provided. The method includes determining a need for a wireless device for performing SRS carrier based switching from a first cell, cell1, operating on a first carrier frequency, F1, to a second cell, cell2, operating on a second carrier frequency, F2. The method further includes determining the need for a wireless device to acquire a system information, SI, of a third cell, cell3, on a third carrier frequency, F3, during a time period, T1. Furthermore, the method includes determining a minimum number of uplink feedback signals in the first cell, cell1, that a wireless device transmits in response to receiving downlink data in the first cell, cell1, where the minimum number of uplink feedback signals in the first cell, cell1, is dependent on whether SRS switching causes interruption on first cell, cell1

In certain embodiments a network node, connectable to a wireless device in wireless communication network, for system information, SI, handling during sounding reference signals, SRS, carrier based switching is provided. The network node includes a radio transceiver circuitry configured to send signals to the wireless communication network and to receive signals from the wireless communication network and processing circuitry operatively associated with the radio transceiver circuitry and configured to determine a need for a wireless device for performing SRS carrier based switching from a first cell, cell1, operating on a first carrier frequency, F1, to a second cell, cell2, operating on a second carrier frequency, F2. The processing circuitry further configured to determine the need for a wireless device to acquire a system information, SI, of a third cell, cell3, on a third carrier frequency, F3, during a time period, T1. Furthermore, the processing circuitry is configured to determine a minimum number of uplink feedback signals in the first cell, cell1, that a wireless device transmits in response to receiving downlink data in the first cell, cell1, wherein the minimum number of uplink feedback signals in the first cell cell1, is dependent on whether SRS switching causes interruption on first cell, cell1.

In certain embodiments a method for a wireless device for acquiring system information, SI, during sounding reference signals, SRS, carrier based switching, is provided. The method includes determining a need for performing SRS carrier based switching from a first cell, cell1, operating on a first carrier frequency, F1, to a second cell, cell2, operating on a second carrier frequency, F2. The method further includes acquiring a system information, SI, of a third cell, cell3, on a third carrier frequency, F3, during a time period, where the time period is dependent on whether SRS switching causes interruption on first cell, cell1.

In certain embodiments a wireless device configured for operation in a wireless communication network comprising at least a network node, a first cell, a second cell, and a third cell, and for acquiring system information, SI, during sounding reference signals, SRS, carrier based switching is provided. The wireless device includes a radio transceiver circuitry configured to send signals to the wireless communication network and to receive signals from the wireless communication network and processing circuitry operatively associated with the radio transceiver circuitry, and configured to determine a need for performing SRS carrier based switching from a first cell, cell1, operating on a first carrier frequency, F1, to a second cell, cell2, operating on a second carrier frequency, F2. The processing circuitry is further configured to acquire a system information, SI, of a third cell, cell3, on a third carrier frequency, F3, during a time period, wherein the time period is dependent on whether SRS switching causes interruption on first cell, cell1.

BRIEF DESCRIPTION OF THE DRAWINGS

The accompanying drawings, which are included to provide a further understanding of the disclosure and are incorporated in and constitute a part of this application, illustrate certain non-limiting embodiment(s) of inventive concepts. In the drawings.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

Various present embodiments disclosed herein may overcome one or more of the potential problems explained above with some previously known approaches.

The various embodiments herein are directed to operations and methods performed by a user equipment and/or a network node. The user equipment (UE) may be a cellular radiotelephone—e.g., a smartphone, a feature phone, etc. Alternatively, the user UE comprises a network adaptor or card, a modem or other such interface device, a tablet or laptop computer, or other device with wireless communication capabilities. Of course, these examples are non-limiting and the user equipment should be broadly understood as a communications transceiver. And, as noted above, the wireless device 12, which also may be referred to as a "wireless communication device", may be comprised in a UE. The terms UE, wireless device and wireless communication device may be, through the embodiments disclosed herein, interchangeably used.

Figure 1:
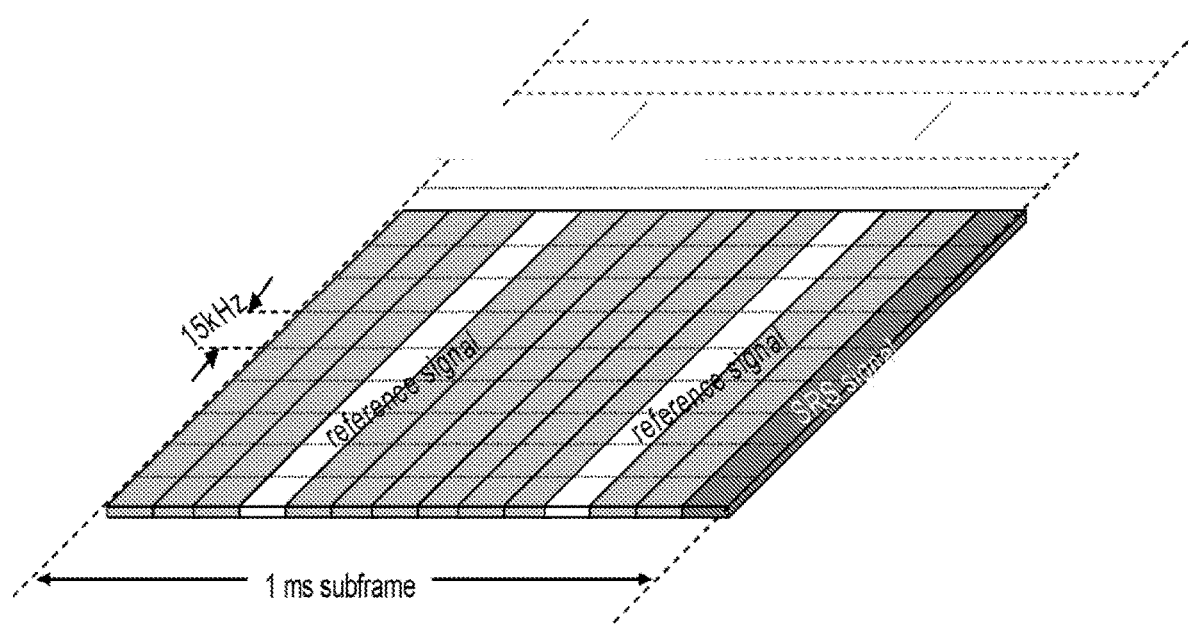
FIG. 1 shows an exemplary uplink transmission subframe.
Figure 2:
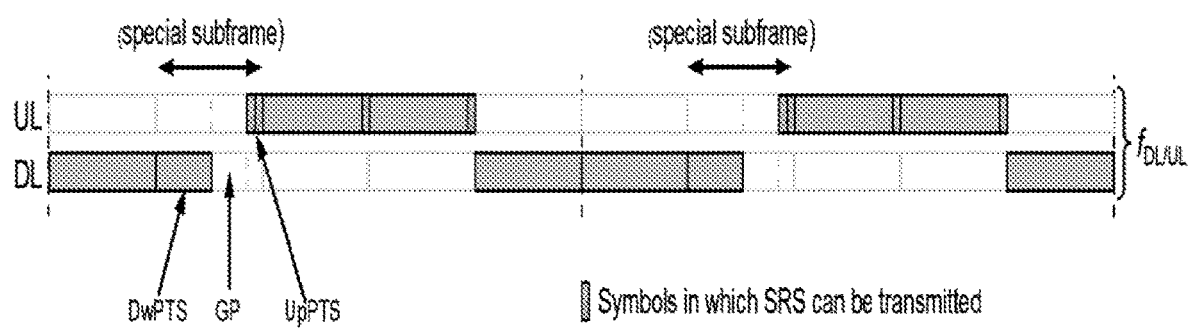
FIG. 2 shows examplary TDD with 3DL:2UL; within a 10 ms radio frame, up to eight symbols may be set aside for sounding reference signals.
Figure 3:
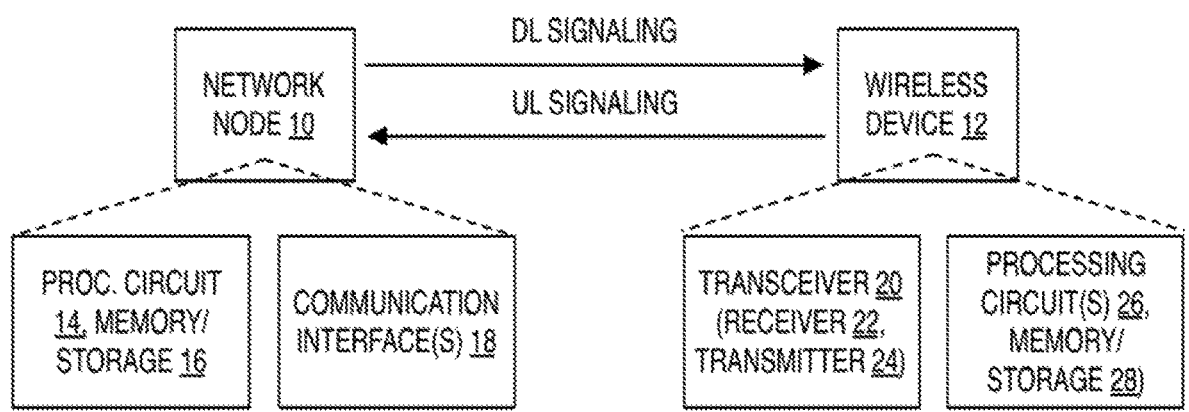
FIG. 3 is a block diagram of an examplary network node and a wireless device.

With the above discussion in mind FIG. 3 illustrates an example network node 10 and an associated UE or wireless device 12, which may be included in a UE but is not limited to such examples. Correspondingly, the network node 10 may comprise, e.g., a type of base station or another radio node within the Radio Access Network, RAN, portion of a wireless communication network. In at least some embodiments, the network node 10 comprises an LTE eNB and the wireless device 12 is comprised in a UE configured for operation in LTE-based networks.

Figure 4:
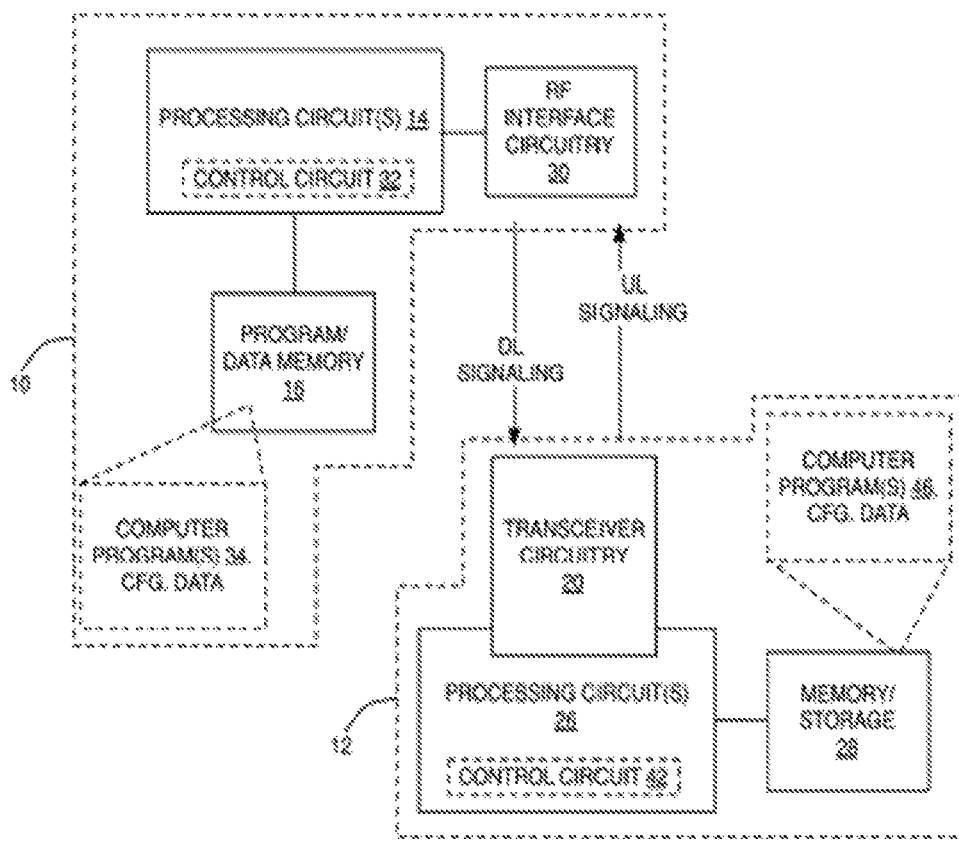
FIG. 4 is a block diagram of an examplary network node and a wireless device.

Turning back to the diagram, those of ordinary skill in the art will appreciate that FIG. 4 illustrates functional and/or physical circuit arrangements and that the network node 10 and the wireless device 12 generally will include digital processing circuits and associated memory or other computer-readable medium for storing configuration data, operational or working data, and for storing computer program instructions. In at least some of the embodiments contemplated herein, the network-side and device-side functionality is realized at least in part through the programmatic configuration of digital processing circuitry, based on the execution by that circuitry of stored computer program instructions.

One sees from the example that the network node 10 includes a processing circuit 14 and associated memory/storage 16. The memory/storage 16 comprises, for example, one or more types of computer-readable medium, such as a mix of volatile, working memory and non-volatile configuration and program memory or storage. The network node 10 further comprises one or more communication interfaces 18.

The communication interface 18 depends on the nature of the network node 10. In a base station or other radio node example, the communication interface 18 includes a radio transceiver, e.g., pools of radio transmission, reception, and processing circuitry, for communicating with any number of wireless devices 12 in any one or more cells of a wireless communication network. In such example cases, the communication interface 18 includes one or more transmitters and receivers, e.g., cellular radio circuits, along with power control circuitry and associated signal-processing circuitry. Further, in the same scenario, the communication interface 18 may include inter-base-station interfaces and/or backhaul or other Core Network, CN, communication interfaces.

Regardless of its intended use, FIG. 3 illustrates the wireless device 12 as including a communication interface, e.g., a radiofrequency transceiver 20 that includes a receiver 22 and a transmitter 24. The illustrated wireless device 12 further includes one or more processing circuits 26, which include or are associated with one or more memory/storage devices or circuits 28. The memory/storage devices or circuits 28 include, for example, one or more types of computer-readable medium, such as a mix of volatile, working memory and non-volatile configuration and program memory or other storage.

The network in an example embodiment comprises a Long Term Evolution or LTE network, NR or a LTE-Advanced network, meaning that the network is configured to operate according to the applicable specifications promulgated by the Third Generation Partnership Project or 3GPP. The network may also be referred to as a communication system. In the LTE context, the base stations—referred to as eNBs or eNodeBs or network nodes 10—provide an air interface for wirelessly connecting the wireless devices 12 to the network, where the air interfaces use Orthogonal Frequency Division Multiple Access or OFDMA on the downlink and use Single Carrier-Frequency Division Multiple Access or SC-FDMA on the uplink. It will be appreciated that the wireless devices 12 are configured to operate with the air interface, spectrum, and protocols adopted by the network in the LTE case, and in other cases.

The network schedules at least some types of uplink data transmissions by the wireless devices 12. For example, in LTE, Physical Uplink Shared Channel, PUSCH, transmissions are scheduled by a base station 10, based on the base station sending uplink grants to respective ones of the wireless devices 12 being served by the base station. The base station uses associated reference signals transmitted from the wireless devices 12 to demodulate or otherwise process the scheduled uplink data transmissions. As explained in the Background, the conventional approach is for the reference signals to be integrated into the uplink data transmissions, such that a wireless device 12 automatically includes one or more reference signals, e.g., Sounding Reference Symbols or SRS, in each scheduled uplink data transmission.

The embodiments disclosed herein are directed to Acquiring SI under SRS carrier based switching.

The basic idea is that serving cell performance of one or more serving cells (e.g., cell1) when acquiring SI of a target cell (cell2) is dependent on SRS carrier based switching configuration involving SRS operation on at least one of cell1 and cell2. In another aspect of the embodiments, SRS carrier based switching operation is adapted in order to minimize interruption on serving cell while the UE acquires SI of the target cell.

Potential advantages of the proposed solution are:
  The adaptation of SRS switching ensures that the serving cell performance is not degraded.
  The impact of SRS switching on the serving cell performance is well defined and quantified while the UE acquires SI of the target cell.
  The performance of the UE mobility procedures relying on CGI reading of the target cell while SRS switching is done are not deteriorated.
  SI acquisition performance can be maintained, even if UE is performing SRS switching Definitions of Terms The term user equipment (a.k.a. UE) used herein may refer to any type of wireless device communicating with a network node and/or with another UE in a cellular or mobile communication system. Examples of UE are target device, device to device (D2D) UE, machine type UE or UE capable of machine to machine (M2M) communication, PDA, iPAD, Tablet, mobile terminals, smart phone, laptop embedded equipped (LEE), laptop mounted equipment (LME), USB dongles etc. The UE may comprise the wireless device. The terms UE, wireless device and wireless communication device may be, through the embodiments disclosed herein, interchangeably used.

The term "network node" used herein may refer to a radio network node or another network node, e.g., a core network node, MSC, MME, O&M, OSS, SON, positioning node (e.g. E-SMLC), MDT node, etc.

The term "radio network node" used herein can be any kind of network node comprised in a radio network which may further comprise any of base station (BS), radio base station, base transceiver station (BTS), base station controller (BSC), radio network controller (RNC), evolved Node B (eNB or eNodeB), Node B, multi-standard radio (MSR) radio node such as MSR BS, relay node, donor node controlling relay, radio access point (AP), transmission points, transmission nodes, Remote Radio Unit (RRU) Remote Radio Head (RRH), nodes in distributed antenna system (DAS) etc.

In the embodiments, any of the above mentioned nodes (UE, network node, or radio network node) can be "the first node" and/or "the second node" in the embodiments described herein. The first node and the second node may be capable of at least one of transmitting and receiving in licensed and/or unlicensed spectrum.

The term radio access technology, or RAT, may refer to any RAT e.g. UTRA, E-UTRA, narrow band internet of things (NB-IoT), WiFi, Bluetooth, next generation RAT (NR), 4G, 5G, etc. Any of the first and the second nodes may be capable of supporting a single or multiple RATs.

A UE may be configured to operate in carrier aggregation (CA) implying aggregation of two or more carriers in at least one of DL and UL directions. With CA, a UE can have multiple serving cells, wherein the term 'serving' herein means that the UE is configured with the corresponding serving cell and may receive from and/or transmit data to the network node on the serving cell e.g. on PCell or any of the SCells. The data is transmitted or received via physical channels e.g. PDSCH in DL, PUSCH in UL etc. A component carrier (CC) also interchangeably called as carrier or aggregated carrier, PCC or SCC is configured at the UE by the network node using higher layer signaling e.g. by sending RRC configuration message to the UE. The configured CC is used by the network node for serving the UE on the serving cell (e.g. on PCell, PSCell, SCell etc) of the configured CC. The configured CC is also used by the UE for performing one or more radio measurements (e.g. RSRP, RSRQ etc) on the cells operating on the CC e.g. PCell, SCell or PSCell and neighboring cells.

The term dual connectivity used herein may refer to the operation mode wherein the UE can be served by at least two nodes called master eNB (MeNB) and secondary eNB (SeNB). More generally in multiple connectivity (aka multi-connectivity) operation the UE can be served by two or more nodes e.g. MeNB, SeNB1, SeNB2 and so on. The UE is configured with PCC from both MeNB and SeNB. The PCell from MeNB and SeNB are called as PCell and PSCell respectively. The PCell and PSCell operate the UE typically independently. The UE is also configured with one or more SCCs from each of MeNB and SeNB. The corresponding secondary serving cells served by MeNB and SeNB are called SCell. The UE in DC typically has separate TX/RX for each of the connections with MeNB and SeNB. This allows the MeNB and SeNB to independently configure the UE with one or more procedures e.g. radio link monitoring (RLM), DRX cycle, etc on their PCell and PSCell respectively.

The term SRS used herein may refer to any type of reference signal (RS) or more generally physical radio signals transmitted by the UE in the UL to enable the network node to determine the UL signal quality e.g. UL SNR, SINR, etc. Examples of such reference signals are sounding reference signals, DMRS, UE specific reference or pilot signals etc. The embodiments are applicable to any type of RS i.e. switching of carrier transmitting any type of RS.

The term signal used herein can be any physical signal e.g. reference signal such as PSS, SSS, CRS, PRS etc.

The term channel (e.g., in the context of channel reception) used herein can be any physical channel e.g. MIB, PBCH, NPBCH, PDCCH, PDSCH, MPDCCH, NPDCCH, NPDSCH, E-PDCCH, PUSCH, PUCCH, NPUSCH etc.

The term time resource used herein may correspond to any type of physical resource or radio resource expressed in terms of length of time. Examples of time resources are: symbol, time slot, subframe, radio frame, TTI, interleaving time, etc.

The term radio measurement used herein may comprise any measurement based on receiving a radio signal or channel, e.g., power-based measurements such as received signal strength (e.g., RSRP or CSI-RSRP) or quality measurements (e.g., RSRQ, RS-SINR, SINR, Es/Iot, SNR); cell identification; synchronization signals measurements; angle measurements such as angle of arrival (AOA); timing measurements such as Rx-Tx, RTT, RSTD, TOA, TDOA, timing advance; throughput measurements; channel quality measurements such CSI, CQI, PMI, channel measurement (e.g. MIB, SIBs, SI, CGI acquisitions etc). A measurement may be absolute, relative to a common reference or to another measurement, composite measurement (U.S. 61/678,462 filed on 2012 Aug. 1), etc. A measurement may be on one link or more than one links (e.g., RSTD, timing advance, RTT, relative RSRP; measurements over multifarious links described in PCT/SE2012/050644 filed on 2012 Jun. 13, etc.). Measurements may also be differentiated by purpose and may be performed for one or more purposes, e.g., for one or more of: RRM, MDT, SON, positioning, timing control or timing advance, synchronization. In a non-limited example, the embodiments may apply to any measurement such as described above.

Herein, the term "radio measurement" may be used in a broader sense, e.g., receiving a channel (e.g., receiving system information via broadcast or multicast channel).

The term requirements used herein may comprise any type of UE requirements related to UE measurements aka measurement requirements, RRM requirements, mobility requirements, positioning measurement requirements etc. Examples of UE requirements related to UE measurements are measurement time, measurement reporting time or delay, measurement accuracy (e.g. RSRP/RSRQ accuracy), number of cells to be measured over the measurement time etc. Examples of measurement time are L1 measurement period, cell identification time or cell search delay, CGI acquisition delay etc.

In some embodiments, SRS switching and SRS carrier based switching may be used interchangeably to describe transmitting SRS on different carriers. SRS switching may be based on a time and/or frequency domain pattern. SRS switching may further involve SRS transmission types described in the Background above 2.1.2 or other SRS transmission types. More example scenarios are described below.

The term interruption or interruption level or interruption performance used herein may correspond to any type of interruption of signals between the UE and the serving cell (e.g. PCell or SCells or PSCell). The interruption leads to loss or degradation of serving cell performance. The interruptions may affect the performance of any one or more serving cells e.g. PCell, PSCell, SCell etc. The loss in serving cell performance or the interruption can be expressed in terms of one or more metrics, which may be absolute or relative, such as error rate or loss of packets or packet loss rate or number of packets lost or packet drop rate or a reduction in the detection probability or an increase of misdetection probability or even probability of missed or dropped or lost packets. The interruption level can be expressed in terms of one or more time resources which are interrupted e.g. interruption time of 1 subframe, 5 subframes, 1 TTI, 2 TTI etc. The packet herein refers to any 'block of data' such as transport block sent over radio interface in UL or DL. The packet loss rate or number of lost packets is typically estimated over certain period of time e.g. measurement time of a radio measurement, pre-defined time etc. In one example the number of lost packets is expressed as total number of missed ACK/NACK in response to continuous transmission of data to the UE from its serving cell over certain time period. For example the number of packets lost in LTE with 1 ms TTI will be 10 if the UE is unable to transmit 10 ACK/NACK in UL in response to continuous DL transmission over a period of 100 ms. In this example the corresponding packet loss rate is 10% or 0.1. This may also be stated as the probability with which the fraction of ACK/NACK transmitted in the uplink in response to continuous DL transmission over a period are missed or dropped or lost. It may also be expressed as ratio of any one or both of the following:

the number of missed ACK/NACK transmitted by the UE in response to continuous transmission of downlink data to the UE from its serving cell over certain time period (T0)

the total number of ACK/NACK transmitted by the UE in response to continuous transmission of downlink data to the UE from its serving cell if all data blocks are received.

Therefore the serving cell performance (e.g. PCell or SCell or PSCell performance) may be expressed in terms of the probability of missed ACK/NACK or in terms of total number of missed ACK/NACK in response to receiving DL data. For interruption on PCell it can be termed as 'PCell interruption in terms of number of missed ACK/NACK'. For interruption on any SCell it can be termed as 'SCell interruption in terms of number of missed ACK/NACK'.

System information (SI) may comprise, e.g., the information comprised in any one or more of: MIB, SIB1, SIB2, SIB3, etc.

For the purpose of SRS carrier based switching, UE may transmit not only SRS but also PRACH, e.g., to enable UE timing estimation.

The term random access used herein may be a non-contention based PRACH transmission. In one example, the PRACH transmission may be over SRS SCell without PUSCH i.e. SCell not configured with PUSCH. The PRACH is transmitted for enabling the network node estimate the timing advance parameter for the TAG which contains the SCell without PUSCH. In general, the random access related to SRS switching may be contention-based or non-contention based, and may be performed, e.g., on SCell, PSCell, or PCell.

Exemplary Embodiments: Deployment Scenarios Involving SRS Carrier Based Switching The basic scenario comprises of a UE being served by a first network node with a PCell operating on a first carrier frequency (f1), wherein the UE is also capable of being served by at least one secondary serving cell (SCell) also known as a first SCell. The UE may further be capable of being served by two or more SCells, e.g., the first SCell operates on a second carrier frequency (f2) and the second SCell operates on a third carrier frequency (f3). The same applies for more than two SCells. The carrier f1 is interchangeably called as PCC, while carriers f2, f3, . . . , f(n) may interchangeably be called as SCC1, SCC2, . . . , SCC(n−1) etc., respectively.

In one embodiment, all f1, f2, and f3 belong to the licensed spectrum. Other combinations are also possible. In yet another example, the carrier f1 and f3 or even all of f1, f2, and f3 belong to a licensed spectrum or band, whereas f2 belongs to an unlicensed spectrum or frequency band. In an unlicensed spectrum or band, contention based transmission is allowed i.e. two or more devices (UE or network nodes) can access even the same part of spectrum based on certain fairness constraints, e.g. LBT. In this case, no operator (or user or transmitter) owns the spectrum. In a licensed spectrum or licensed band only contention free transmission is allowed i.e. only devices (UE or network nodes) allowed by the owner of the spectrum license can access the licensed spectrum. In one example of the use case, all carriers can be in unlicensed spectrum, or in a license shared spectrum or in a spectrum where LBT is required.

In one embodiment, the CCs and the corresponding serving cells of a UE may be comprised all in the same node. In another example, at least two of them may be comprised in different nodes, which may be co-located or non-collocated.

In one embodiment all the CCs and the corresponding serving cells of a UE may be configured in the same timing advance group (TAG) e.g. pTAG. In another example some CCs and the corresponding serving cells of a UE may be configured in one timing advance group (TAG) (e.g. pTAG) and remaining CCs in another TAG (e.g. sTAG). The yet another example the UE may be configured with 2 or more TAGs.

The above scenarios may also comprise DC or multi-connectivity operation performed based on corresponding CA configurations, where PSCell in different embodiments may be belong, e.g., to a set of SCells.

Exemplary Embodiments: SRS Switching Scenario

SRS switching may involve at least one of:
starting SRS transmission on a first carrier frequency and/or stopping SRS transmission on a second carrier frequency, wherein the first and the second carrier frequency may belong to licensed and/or unlicensed spectrum, same RAT or different RATs. According to the earlier examples, the SRS carrier based switching may involve any one or more carriers of f1, f2, f3, . . . , f(n);
starting and/or stopping SRS transmission from one or more antennas or antenna ports.

In one embodiment, SRS switching may comprise carrier based SRS switching and/or antenna based SRS switching.

The SRS switching may be controlled by the network and/or by the UE.

Even though some embodiments are described for carrier based SRS switching, they are applicable for any SRS switching type.

Switching among carriers and/or antennas during SRS switching may also cause some interruptions, e.g., to PCell or activated SCell, which may be due to UE reconfiguration such as configuring and/or activating target carriers (to which the SRS transmission is switched to), deconfiguring and/or deactivating source carriers (from which SRS transmission is switched), delays, reduced performance, etc.

Figure 5:
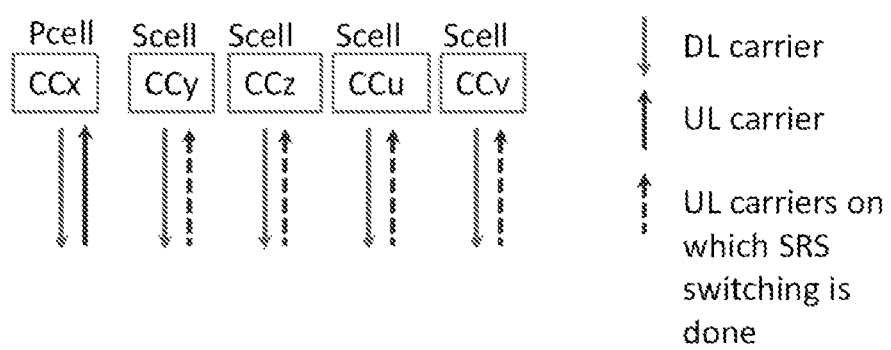
FIG. 5 illustratively shows a configuration with 5DL CA and 2 UL CA for SRS carrier based switching.

As an exemplary CC combination, there is an arrangement with 5DL CA and 2UL (or more UL) CA operation as shown in FIG. 5. This example shows a 5DL CA together with 2 UL CA, where one UL is fixed in the PCell and the SRS switching is done on one of the SCells (e.g., from SCell1 to SCell2). So, at any point of time, it's a 2UL CA combination. The same example scenario an also be shown with other numbers aggregated CCs in DL and UL respectively. The carriers, i.e. CCy, CCz, CCu and CCv, can be in different band also. For example, CCy can be in any band below 1 GHz, CCz can be in any band around 2 GHz and CCu can be any band in 3.5 GHz.

In an unlicensed spectrum or band, the contention-based transmission is allowed i.e. two or more devices (UE or network nodes) can access even the same part of spectrum based on certain fairness constraints, e.g. LBT. In this case no operator (or user or transmitter) owns the spectrum. In a licensed spectrum or licensed band only contention free transmission is allowed i.e. only devices (UE or network nodes) allowed by the owner of the spectrum license can access the licensed spectrum.

The term 'served or being served' herein means that the UE is configured with the corresponding serving cell and can receive from and/or transmit data to the network node on the serving cell e.g. on PCell or any of the SCells. The data is transmitted or received via physical channels e.g. PDSCH in DL, PUSCH in UL etc.

The UE may be requested to switch SRS transmission to one or more serving cells by the network node. In some embodiments one or more SRS switching messages or commands may be received by the UE via RRC signaling. In some embodiments one or more SRS switching messages or command may be received by the UE via MAC CE command.

For example, the following signaling may apply:
Receiving a first serving cell SRS switching request message or command from a second network node for switching SRS carrier from the first serving cell;
Receiving a second serving cell SRS switching request message or command from a third network node for switching SRS carrier from the second serving cell;
Receiving a third serving cell SRS switching request message or command from a fourth network node for switching SRS carrier from the third serving cell;

In some embodiments, at least some of the first, second, third and fourth network nodes are the same or are co-located at the same site or location. For example, in such embodiments the UE may receive one or more messages or command for switching SRS carrier(s) from one or more serving cells from the first network node. Also for example in such embodiments the UE may receive one or more messages for SRS switching of one or more serving cells from the PCell.

In some embodiments, the any combination of the first, second, third and fourth network nodes are different and may be located at different sites or location or may be logically different nodes that may still be co-located. In such embodiments the UE may receive one or more messages for SRS carrier switching from one or more serving cells from the respective serving cells.

Exemplary Embodiments and Method Step of Wireless Device/UE

Figure 6:
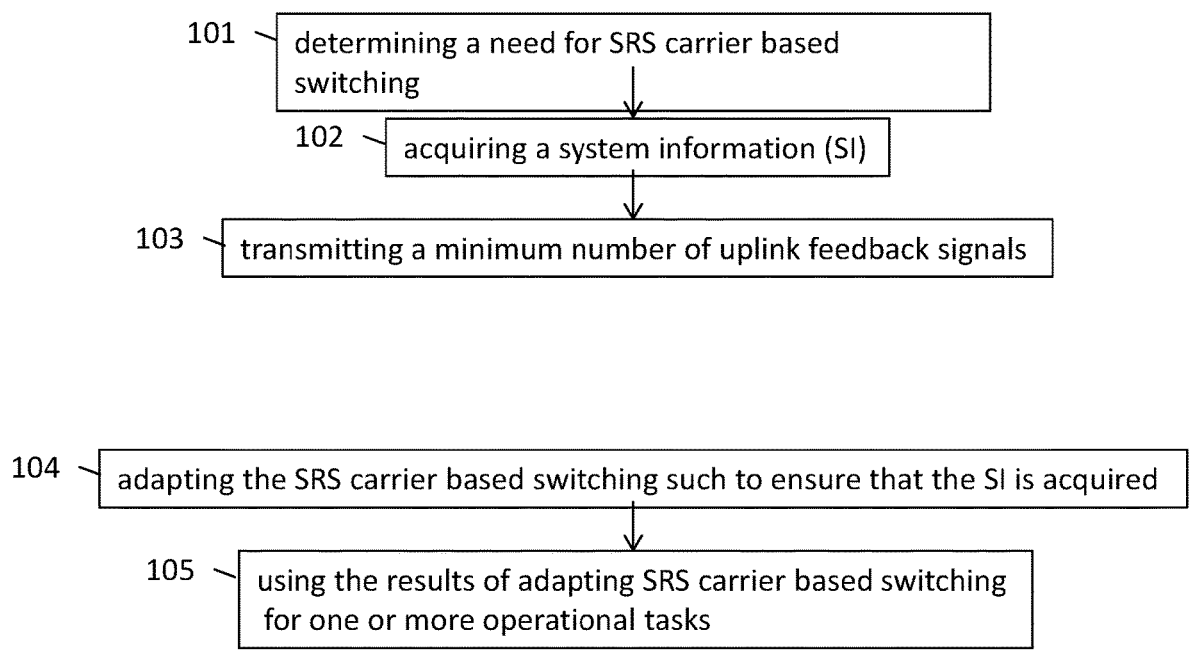
FIG. 6 illustratively shows a block diagram of example embodiments of a method for wireless device according to the teachings herein.

Exemplary embodiments and method step of wireless device/UE are shown FIG. 6.

Step 101: Determining the need to perform SRS carrier based switching from a first cell (cell1) operating on a first carrier frequency (F1) to a second cell (cell2) operating on a second carrier frequency (F2) for transmitting SRS on cell2 in second carrier frequency (F2) or vice versa. This step may also include determining the need may be based on a configuration received from another node. In step 101 the need may be determined, e.g., based on a message received from another node and/or upon a triggering event or condition or counter/timer. In one example, the UE may be configured by a network node to perform SRS carrier based switching from cell1 for transmitting SRS on cell2 when cell1 and cell2 operate on F1 and F2 respectively. As an example cell1 and cell2 are serving cells of the UE corresponding to SCell1 and SCell2 respectively or PCell and SCell respectively or SCell and PCell respectively. In one other example the UE may be requested to switch its transmission from cell1 to cell2 for transmitting SRS on cell2. In another example the UE may be requested to switch its transmission from cell2 to cell1 for transmitting SRS on cell1. In yet another example the UE may be requested to switch its transmission from another cell for transmitting SRS on cell1 and cell2 during different time resources. In yet another example the UE may send one or more random access (RA) transmissions on cell2 on second carrier frequency F2 to support SRS carrier based switching. For example the UE may perform non-contention based PRACH transmission over SRS SCell without PUSCH (e.g. cell2). This may cause interruption on cell1 and/or cell2.

Step 102: Acquiring a system information (SI) of a third cell (cell3) on a third carrier frequency (F3) using autonomous gaps during a time period (T1). In step 102, the need to acquire SI may be determined, e.g., based on a message (e.g., request or SI transmission configuration information) received from another node (e.g., serving BS) and/or upon a triggering event or condition or counter/timer. The UE may also determine time and/or frequency resources in which SI is provided. In a further example, the UE may be requested to acquire a SI of a third cell (cell3), which may operate on a third carrier (F3). In some embodiment F1 and F3 are the same e.g. cell3 is an intra-frequency cell. In some embodiment F3 and F2 are the same e.g. cell3 is an intra-frequency cell. In some embodiment F3 is different than F1 and F2 e.g. F3 is inter-frequency carrier.
The UE may initiate the acquisition of cell3 based on any one or more of the following mechanisms:
  Measurement configuration message received from another node (e.g., a network node or another UE),
  A message or an indication, received from a higher layer in the UE indicating the need to acquire the SI of cell3,
  Event, condition, or a trigger based on which the UE should acquire the SI of cell3. For example the UE may acquire the SI if signal quality of current serving cell falls below a threshold. In another example the UE may acquire the SI if the UE acquires the same PCI for two or more cells including cell3,
  A timer in the UE indicating that the SI of cell3 needs to be acquired by the UE.

One specific example of received request can be a RRC message containing one or more of 'reportCGI' or 'report CSG indicator' or 'reporting SI'. The term 'acquisition of SI or acquiring SI' may also be called as 'SI reading or reading of SI', 'identifying or identification of SI', 'determining SI' etc. The SI to be acquired by the UE may comprise of one or more blocks containing SI e.g. MIB, SIB1, SIB2, etc. For example the UE may be requested to acquire CGI of cell3 transmitting in SI of the cell3. In another example SI may comprise of closed subscriber group (CSG) indicator transmitted by cell3. The UE then creates autonomous gaps in one or more serving cells to acquire the SI of cell3 during certain time period (T1). The parameter, T1, can be pre-defined, configured by the network node or by another node. For example the UE may create at least 8 gaps each of 5 ms for acquiring MIB and SIB1 of cell3 during T1. The UE may further create one or more gap each of 9 ms for acquiring AGC of cell3.
During the autonomous gaps the UE:
  may not transmit any signal in the UL of cell1 and cell2, and
  may not receive any signal in the DL from cell1 and cell2.

Step 103: Transmitting a minimum number of uplink feedback signals. Alternatively, step 103 may comprise transmitting a first minimum number (N1) of uplink feedback signals in cell1 in response to receiving downlink data in cell1 if no SRS switching occurs in (or between) any of cell1 and cell2 during T1 and a second minimum number (N2) of uplink feedback signals in cell1 response to receiving downlink data in cell1 if SRS switching occurs in (or between) at least cell1 and cell2 during T1. In step 103 the UE may receive downlink data from cell1 during T1 and in response to the received data the UE may transmit uplink feedback signals on cell1 or cell2. The UE may transmit the UL feedback signals on cell1 or on cell2. In one example if cell1 is PCell then the UE may transmit the UL feedback signals on cell1. In another example if cell1 is SCell then the UE may transmit the UL feedback signals on PCell which is cell2 in this example. In yet another example if cell1 is SCell then the UE may transmit the UL feedback signals also on SCell i.e. on cell1 in this example.

The UE may determine a minimum number (N) of UL feedback signals to be transmitted in response to receiving data from cell1 during T1. An example of UL feedback signal is ACK or NACK transmission.

For example, the UE may obtain the minimum number (N) of UL feedback signals that the UE is required to transmit in response to at least continuous transmission of downlink data (e.g. PDSCH) to the UE by the network node on cell1 during T1, wherein the said minimum number, N, is associated with the operation of the SRS carrier based switching. In another example, the DL data transmission may be discontinuous, e.g., periodically available or based on scheduling.

The value of parameters, N and T1 may be pre-defined or configured at the UE by the network node.

The continuous transmission of DL data herein means that the network node transmits data in all the DL time resources (e.g. DL subframes) in cell1 to the UE during the SI acquisition time i.e. over T1. The minimum number, N, may be applicable under or associated with addition conditions or constraints which may comprise of one or more of that during at least part of T1 when the UE is NOT configured with a measurement gap, the UE is NOT configured with any DRX cycle, the UE is not operating in DRX, the UE is configured to receive DL data from the network node with a pre-defined number of code words in one subframe (e.g. 1 code word per subframe) and no MBSFN subframe is configured in serving cell (or PCell). Examples of subframes which can be configured as MBSFN subframes are subframes #1, 2, 3, 6, 7 and 8 for FDD and subframes #3, 4, 7, 8 and 9 for TDD. The MBSFN subframe can contain only PMCH and not PDSCH.

The parameter N may further comprise of parameters N1 or N2. The parameter N (or N1 and N2) may further depend on the TDD configurations (aka TDD UL/DL subframe configurations) used in cell1 and cell1. For example for TDD UL/DL configuration #0 and TDD UL/DL configuration #1 the values of N1 can be 18 and 35 respectively. The parameter N=N1, wherein N1 is the minimum number of UL feedback signals that the UE is required to transmit in response to at least continuous transmission of downlink data (e.g. PDSCH) to the UE by the network node on cell1 during T1 when SRS carrier based switching does not occur on any of the cell1 and cell2. The value of parameters N1 and N2 may be pre-defined or configured at the UE by the network node.

The parameter N=N2, wherein N2 is the minimum number of UL feedback signals that the UE is required to transmit in response to at least continuous transmission of downlink data (e.g. PDSCH) to the UE by the network node on cell1 during T1 when SRS carrier based switching occurs on at least one of the cell1 and cell2. In this case due to SRS switching the transmission and/or reception of signals can be interrupted on cell1 and cell2. For example if the SRS is transmitted on cell2 by using radio circuitry of F1 then there will be interruption of signals transmitted between cell1 and the UE. The SRS switching may further cause interruption of signals transmitted between cell2 and the UE. The interruption may lead to the following consequences:

- the UE may not receive DL data transmitted in all the DL time resources by cell1 to the UE during T1 i.e. UE may lose some of the DL data. This depends on length of each interruption and also on the number of times the SRS switching occurs during T1.
- the UE may not be able to able to transmit all ACK/NACK in UL in response to receive the DL data transmitted by cell1 to the UE during T1 i.e. UE may transmit N2 number of A/N where N2<N1. This value of N2 depends on length of each interruption and also on the number of times the SRS switching occurs during T1. For example if 5 UL subframes in cell1 are interruption due to SRS switching during T1 then for TDD UL/DL configuration #0 and TDD UL/DL configuration #1 the values of N2 can be 13 and 30 respectively.
- The UE may not be able to transmit all ACK/NACK in UL due to UE UL capability (e.g., the UE may not be able to simultaneously transmit over more than X carriers and may have to drop at least one of ACK/NACK transmissions or SRS transmission if this capability has been reached in case the time resources for ACK/NACK transmission and SRS transmission are overlapping or separated in time by less than a threshold)
- the UE may not be able to acquire the SI of cell3 during T1. In one example the duration T1 may be extended to T2 (i.e. T2>T1) in case the interruption at least partly coincides with the time resources in which the autonomous gaps are created by the UE to acquire cell3's SI. This is because the UE may not be able to acquire one or more components of the SI e.g. UE may miss MIB and/or SIB1. For example if the SRS switching occurs during two autonomous gaps used for MIB acquisition then the UE may have to extend the SI acquisition time by the TTI of the MIB e.g. T1 is extended by at least 40 ms i.e. T2=T1+40 ms. This is because the interruption during the autonomous gaps may result in that the DL subframe #0 and/or DL subframe #5 are not available at the UE.
- the UE may further obtain another parameter (N3) corresponding to a minimum number of UL feedback signals when the UE acquires the SI of cell3 during the extended time period, T2. The value of N3 depends on the value of T2 and also on the number of times the SRS switching occurs during T2. The value of N3 can be the same as N1 or it can be larger or even smaller than N1. The value of N3 can be pre-defined, configured by the network node or even determined by the UE (e.g. based N1 and on number of SRS switching operations during T2).

The UE after determining the values of parameters, T1, T2, N1, N2 and N3 may use them for acquiring SI of cell3. The UE may transmit at least the required number of UL feedback signals to the network node in response to receiving DL data on cell1 during T1. For example, if the UE can acquire the SI during T1 and at least one SRS switching occurs during T1 then the UE may transmit at least N2 UL feedback signals to the network node in response to receiving DL data on cell1 during T1. To ensure that the UE can acquire the SI within certain time period one or more rules can be pre-defined. The UE is required to implement and comply with these rules to meet pre-defined requirements related to SI acquisition. Examples of rules are:

- UE configured with SRS carrier based switching can acquire the SI of cell3 within T1 provided that certain number of DL time resources for cell3 are available at the UE during T1. In this case at least certain DL time resources are not interrupted due to SRS switching.
- UE configured with SRS carrier based switching can acquire the SI of cell3 within T1 provided that certain DL time resources containing the SI of cell3 are available at the UE during T1. In this case at least certain DL time resources containing the SI are not interrupted due to SRS switching.
- UE configured with SRS carrier based switching can acquire the SI of cell3 within T1 provided that DL time resources containing MIB and SIB1 of cell3 are available at the UE during T1. In this case at least DL time resources containing the MIB and SIB1 of cell3 are not interrupted due to SRS switching.
- UE configured with SRS carrier based switching can acquire the SI of cell3 within T1 provided that DL subframes #0 and #5 of cell3 are available at the UE during T1. In this case at least DL subframes #0 and #5 are not interrupted due to SRS switching.
- UE configured with SRS carrier based switching can acquire the SI of cell3 within T1 provided that DL subframes #0 and #5 of cell3 are available in every radio frame at the UE during T1. In this case at least DL subframes #0 and #5 are not interrupted in any of the frame over T1 due to SRS switching.
- Otherwise (i.e. if any of the above condition is not met) then the UE may extend the time over which the SI can be acquired for cell3 e.g. from T1 to T2, where T2>T1. In this case the UE may also not be able to transmit N1 number of UL feedback signals.

Step 104: This is step may be an optional step. The step may comprise adapting SRS carrier based switching operation for enabling the UE to transmit N1 uplink feedback signals or at least minimize the difference between N1 and N2. In step 104 the UE adaptively performs SRS carrier based switching on F1 for transmitting SRS on cell1 of and/or on F2 for transmitting SRS on cell2 during T1 when the UE is configured to acquire the SI of cell3 using autonomous gaps. The adaptation of the SRS switching is performed to ensure that the SRS switching does not cause interruption on F3 while the UE is acquiring the SI of cell3. The aim of the adaptation of the SRS switching is to ensure that the UE is able to receive at least DL time resources which contain the SI of cell3 during T1 e.g. DL subframe #0 which contains MIB and DL subframe #5 which contains SIB1. This in turn will ensure that the UE is able to acquire the SI of cell3 during T1.

For example the adaptation of the SRS switching UE may comprise adapting transmission of SRS or switching SRS during certain time resources in cell3. In one example SRS switching is not performed in any DL time resource containing MIB or SIB1. This type of adaptation will ensure that the UE can acquire the SI of cell3 within T1.

In another example the adaptation of the SRS switching UE may comprise adapting transmission of SRS or switching SRS during certain time resources in cell1 and/or cell2. In one example SRS switching is not performed in any DL time resource in cell1 in which the UE is scheduled with DL data. In another example SRS switching is not performed in any UL time resource in cell1 in which the UE transmits UL feedback signals in response to receiving DL data in cell1. This type of adaptation may ensure that the UE can transmit N1 number of UL feedback signals during T1.

The adaptation of the SRS carrier based switching for transmitting SRS on cell1 and/or cell2 may be triggered by the UE based on one or more of the following mechanisms:
autonomously,
based on a pre-defined rule or using a pre-defined configuration e.g. based on pre-defined requirement such as for meeting SI acquisition requirements,
based on the assistance data from another node (e.g., from a network node or from another UE).

Step 105: Using the results of adapting SRS carrier based switching operation for one or more operational tasks. In step 105, which is optional, the UE uses the results of the adaptation of the SRS carrier based switching for performing one or more operational tasks. Examples of the operational tasks:
Informing another node (e.g. network node) that the adaptation of the SRS carrier based switching is performed by the UE,
Informing another node (e.g. network node) that the adaptation of the SRS carrier based switching is performed to avoid the impact on measurements on specific carrier frequencies e.g. F1.
Reporting the results of the SI measurement to another node (e.g., a network node or another UE),
Using the SI measurement results for one or more operations e.g. for positioning, power control, link adaptation
Performing the SI measurement while meeting a pre-defined requirement (e.g., measurement time (T1), minimum number of UL feedback signals during T1, number of correctly received messages, etc.).

Figure 8:
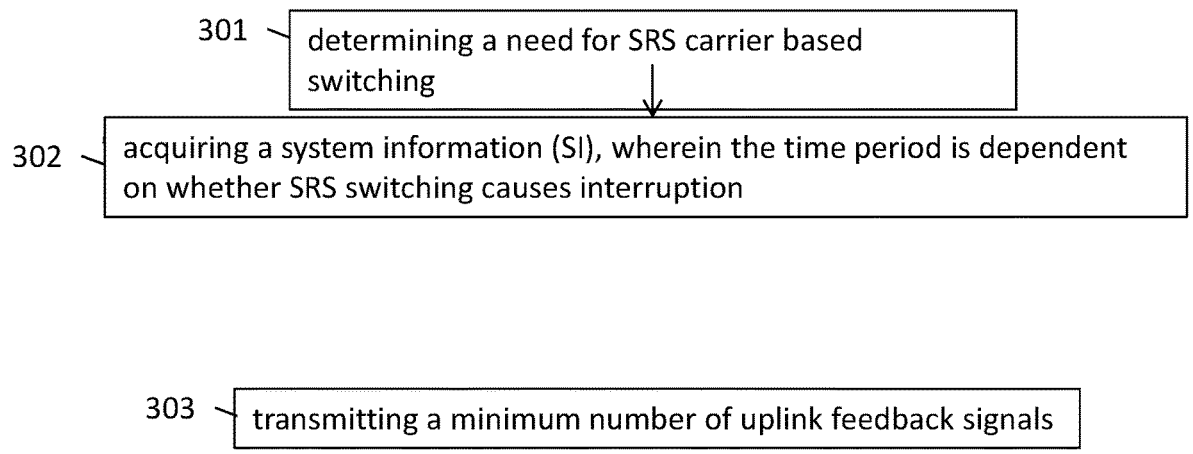
FIG. 8 illustratively shows a block diagram of example embodiments of a method for wireless device according to the teachings herein.

Further exemplary embodiments and method step of wireless device/UE are shown FIG. 8.

Step 301: This step may include the same embodiments of step 101.

Step 302: Acquiring a system information (SI) of a third cell (cell3) on a third carrier frequency (F3) using autonomous gaps during a time period (T1). The time period is dependent on whether SRS switching causes interruption on first cell, cell1 In step 302, the need to acquire SI may be determined, e.g., based on a message (e.g., request or SI transmission configuration information) received from another node (e.g., serving BS) and/or upon a triggering event or condition or counter/timer. This step may also include some embodiments disclosed under the description of step 102 and/or 103 above.

Step 303. Transmitting a minimum number of uplink feedback signals. This step may also include some of the embodiments disclosed under the description of step 102 and/or 103 above.

Exemplary Embodiments and Method Step of the Network Node

Figure 7:
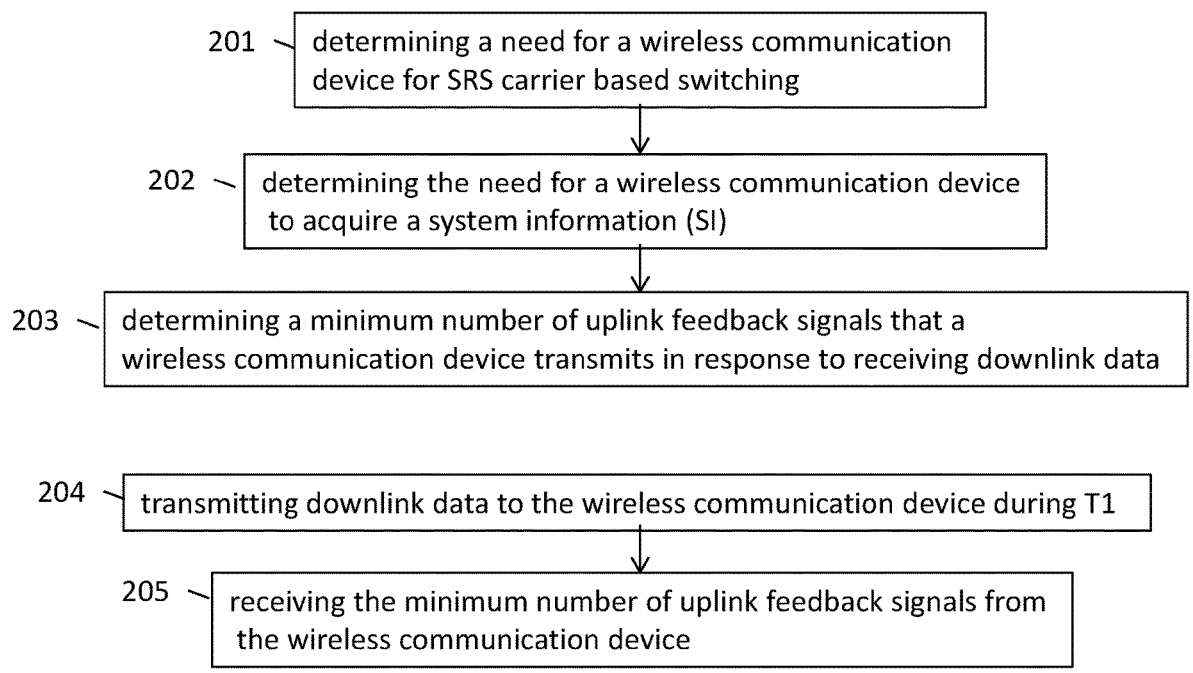
FIG. 7 illustratively shows a block diagram of example embodiments of a method for network node according to the teachings herein.

Exemplary embodiments and method step of network node are shown FIG. 7.

Step 201: Determining a need for a wireless device for SRS carrier based switching from a first cell (cell1) operating on a first carrier frequency (F1) to a second cell (cell2) operating on a second carrier frequency (F2). In step 201 the network node determines the need for a UE/wireless device to perform SRS carrier based switching from a first cell (cell1) operating on a first carrier frequency (F1) to a second cell (cell2) operating on a second carrier frequency (F2) for transmitting SRS on a second cell (cell2) operating on a second carrier frequency (F2) or vice versa. Determining the need may also further comprise configuring the UE to perform SRS carrier based switching. In step 201 the network node determines the need for the UE to perform SRS carrier based switching operation on cell1 belonging to F1 and/or on cell2 belonging to F2. In one example the UE may be configured to switch from carrier F1 to carrier F2 to transmit SRS on cell2. In another example the UE may be configured to switch from carrier F2 to carrier F1 to transmit SRS on cell1. In yet another example the UE may be configured to switch from another carrier to carrier F1 and/or F2 to transmit SRS on cell1 and/or cell2 respectively. The determining may be based on a pre-defined rule, such as transmission configuration, scheduling, etc.

Step 202: Determining the need for a UE to acquire a system information (SI) of a third cell (cell3) on a third carrier frequency (F3) using autonomous gaps during a time period (T1). Determining the need may also further comprise configuring the UE to acquire the SI and/or providing SR transmission configuration information. In step 202 the network node determines the need for the UE to acquire SI of cell3. The determining may be based, e.g., on a timer/counter, scheduling, SI configuration and/or request sent to the UE, etc. In one example, the network node requests the UE to acquire a SI of a third cell (cell3), which may operate on a third carrier (F3). In some embodiment F1 and F3 are the same e.g. cell3 is an intra-frequency cell. In some embodiment F3 and F2 are the same e.g. cell3 is an intra-frequency cell. In some embodiment F3 is different than F1 and F2 e.g. F3 is inter-frequency carrier (cf. step 102 for the wireless device/UE).

Step 203: Determining a minimum number of uplink feedback signals in the first cell (cell1) that a wireless device transmits in response to receiving downlink data in the first cell (cell1), wherein the minimum number of uplink feedback signals in the first cell (cell1) is dependent on whether SRS switching occurs. Alternatively step 203 comprises determining a first minimum number (N1) of uplink feedback signals that the UE may transmit in cell1 in response to receiving downlink data in cell1 if no SRS switching occurs during T1 in (or between) any of cell1 and cell2 and a second minimum number (N2) of uplink feedback signals that the UE may transmit in cell1 in response to receiving downlink data in cell1 if SRS switching occurs during T1 in (or between) at least one of cell1 and cell2. In step 203 the network node determines or obtains parameters T1, T2, N1, N2 and N3. These parameters are described in UE embodiment under the description of step 103.

In one example one or more parameters (T1, T2, N1, N2 and N3) may be pre-defined. In this case the network node may retrieve their values from its memory.

In another example one or more parameters (T1, T2, N1, N2 and N3) may be determined by the network node itself. For example the network node may determine the value of T1 based on the purpose for which the SI is required by the network node. Examples of purposes are mobility procedure, for establishing automatic neighbor relation such as SON, parameter tuning etc.

Step 204: Transmitting downlink data to the UE during T1 in cell 1. In step 204 the network node transmit data to the UE in all DL time resources during at least T1 in at least cell1. If the UE cannot acquire the SI of cell3 during T1 then the network node may schedule DL data in all DL time resources over a time period longer than T1 e.g. over T2. The network node may determine that the UE cannot acquire the SI in T1 by determining whether the SRS switching occurs during T1 and whether the SRS switching causes interruption during autonomous gaps. The network node can determine the SRS operation by observing SRS reception in a cell on F3.

Step 205: Receiving the minimum number of uplink feedback signals from the wireless device in the first cell (cell1) in response to transmitting data to the wireless device. Alternatively step 205 may comprise receiving N1 uplink feedback signals from the UE in cell1 in response to transmitting data to the UE if no SRS switching occurs during T1 in any of cell1 and cell2, and N2 uplink feedback signals from the UE in cell1 in response to transmitting data to the UE if SRS switching occurs during T1 in at least one of cell1 and cell2. In step 205 In this step the network node receives certain number of UL feedback signals in response to transmitting DL data to the UE in at least cell1. The network node expects to receive at least N1 UL feedback signals from the UE if the UE can acquire SI in T1 if no SRS switching occurs in any of cell1 and cell2. The network node expects to receive at least N2 UL feedback signals from the UE if the UE can acquire SI in T2 while SRS switching occurs in at least one of cell1 and cell2.

Step 206: Adapting SRS carrier based switching operation for enabling the UE to transmit N1 uplink feedback signals or at least minimize the difference between N1 and N2. In this step the network node determines that the UE is to adaptively perform SRS carrier based switching for transmitting SRS on cell1 on F1 and/or cell2 on F2 during the time period for acquiring the SI of cell3. The determination may be based on one or more of the following:
  UE's capability to adapt SRS carrier based switching to avoid or minimize the interruption on resources used for acquiring the SI,
  Type or contents of the SI measurement performed by the UE while the UE performs SRS switching,
  Pre-defined rule e.g. UE adaptively perform SRS carrier based switching when performing SI measurement of a cell,
  Based on configuration sent to the UE e.g. request for adapting the SRS carrier based switching while performing the measurement,
  To ensure that the UE can acquire the SI within certain time period e.g. T1,
  To ensure that the UE can transmit at least certain number of UL feedback signals in response to receiving DL data during the SI acquisition time,
  To ensure that the UE can be scheduled on certain DL time resources during the SI acquisition time.

Step 207: Using the results of the number of received uplink feedback signals from the UE in cell1 and/or results of adaptive SRS carrier based switching for performing one or more operational tasks. In this step the network node uses the results of the adaptive SRS carrier based switching and/or the number of the received UL feedback signals from the cell for one or more operational tasks. Examples of adaptation are:
  Adapting the measurement configuration and transmitting the adapted measurement configuration to the UE,
  Reconfiguring cell parameters e.g. transmission power etc,
  Adapting scheduling of signals in the uplink and/or in the downlink,
  Changing the sets of or swapping carrier frequencies of PCell, PSCell and/or SCells of the UE,
  Adapting SRS configuration e.g. periodicity and/or bandwidth of the SRS.

Exemplary Embodiments of the Wireless Device and the Network Node

FIGS. 3 and 4 illustrates example details for embodiments of a network node 10 and a wireless device 12.

The wireless device 12 is configured for operation in a wireless communication network comprising at least a network node, a first cell, a second cell, and a third cell, and for acquiring system information, SI, during sounding reference signals, SRS, carrier based switching. The wireless device includes a radio transceiver circuitry configured to send signals to the wireless communication network and to receive signals from the wireless communication network and processing circuitry operatively associated with the radio transceiver circuitry and configured to determine a need for SRS carrier based switching from a first cell (cell1) operating on a first carrier frequency (F1) to a second cell (cell2) operating on a second carrier frequency (F2). It is further configured to acquire a system information (SI) of a third cell (cell3) on a third carrier frequency (F3) during a time period (T1) and to transmit a minimum number of uplink feedback signals in the first cell (cell1) in response to receiving downlink data in the first cell (cell1), wherein the minimum number of uplink feedback signals in the first cell (cell1) is dependent on whether SRS switching occurs.

The network node 10 is connectable to a wireless device in wireless communication network, for SI handling during SRS carrier based switching. The network node includes radio transceiver circuitry configured to send signals to the wireless communication network and to receive signals from the wireless communication network and processing circuitry operatively associated with the radio transceiver circuitry and configured to determine a need for a wireless device for SRS carrier based switching from a first cell (cell1) operating on a first carrier frequency (F1) to a second cell (cell2) operating on a second carrier frequency (F2). It is further configured to determine the need for a wireless device to acquire a system information (SI) of a third cell (cell3) on a third carrier frequency (F3) during a time period (T1) and to determine a minimum number of uplink feedback signals in the first cell (cell1) that a wireless device transmits in response to receiving downlink data in the first cell (cell1), wherein the minimum number of uplink feedback signals in the first cell (cell1) is dependent on whether SRS switching occurs.

Abbreviations

CA Carrier Aggregation
CC Carrier Component
PCC Primary CC
PCell Primary Cell
SCC Secondary CC
SCell Secondary Cell Further Definitions and Embodiments In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the following examples of embodiments and their equivalents, and shall not be restricted or limited by the foregoing detailed description.

EXAMPLE EMBODIMENTS

Embodiment 1

A method for a wireless device for acquiring system information, SI, during sounding reference signals, SRS, carrier based switching, the method comprises:
  determining a need for SRS carrier based switching from a first cell (cell1) operating on a first carrier frequency (F1) to a second cell (cell2) operating on a second carrier frequency (F2);
  acquiring a system information (SI) of a third cell (cell3) on a third carrier frequency (F3) during a time period (T1);
  transmitting a minimum number of uplink feedback signals in the first cell (cell1) in response to receiving downlink data in the first cell (cell1), wherein the minimum number of uplink feedback signals in the first cell (cell1) is dependent on whether SRS switching occurs.

Embodiment 2

The method of embodiment 1, wherein determining the need for SRS carrier based switching is based on a configuration received from a network node.

Embodiment 3

The method of embodiments 1-2, wherein the wireless device creates autonomous gaps in at least one cells to acquire the SI of the third cell (cell3) during the time period, T1.

Embodiment 4

The method of embodiments 1-3, wherein the minimum number of uplink feedback signals in the first cell if SRS switching do not occur (N1) in, or between, any of first cell (cell1) and second cell (cell2) is larger than the minimum number of uplink feedback signals in the first cell if SRS switching occurs (N2) in, or between, any of cell1 and cell2.

Embodiment 5

The method of embodiments 1-4, wherein the minimum number of uplink feedback signal comprises the number of ACK/NACKs.

Embodiment 6

The method of embodiments 1-5, further comprising:
  adapting the SRS carrier based switching such to ensure that the wireless device acquires the SI of the third cell, cell3, during T1.

Embodiment 7

The method of embodiment 6, wherein adapting SRS carrier based switching comprises receiving at least downlink (DL) time resources that contain the SI of the third cell, cell3, during T1.

Embodiment 8

The method of embodiment 7, wherein DL time resources that contain the SI of the third cell, cell 3, during T1 comprises DL subframe #0, which contains MIB, and DL subframe #5, which contains SIB1.

Embodiment 9

A wireless device configured for operation in a wireless communication network comprising at least a network node, a first cell, a second cell, and a third cell, and for acquiring system information, SI, during sounding reference signals, SRS, carrier based switching, the wireless device comprising: radio transceiver circuitry configured to send signals to the wireless communication network and to receive signals from the wireless communication network; and processing circuitry operatively associated with the radio transceiver circuitry and configured to:
  determine a need for SRS carrier based switching from a first cell (cell1) operating on a first carrier frequency (F1) to a second cell (cell2) operating on a second carrier frequency (F2);
  acquire a system information (SI) of a third cell (cell3) on a third carrier frequency (F3) during a time period (T1); and
  transmit a minimum number of uplink feedback signals in the first cell (cell1) in response to receiving downlink data in the first cell (cell1), wherein the minimum number of uplink feedback signals in the first cell (cell1) is dependent on whether SRS switching occurs.

Embodiment 10

The wireless device of embodiment 9 further configured to perform to the steps of any of method embodiments 1-8.

Embodiment 11

A user equipment comprising the wireless device of any of the preceding embodiments.

Embodiment 12

A method for a network node, connected to a wireless device in wireless communication network, for system information, SI, handling during sounding reference signals, SRS, carrier based switching, the method comprises:
  determining a need for a wireless device for SRS carrier based switching from a first cell (cell1) operating on a first carrier frequency (F1) to a second cell (cell2) operating on a second carrier frequency (F2);
  determining the need for a wireless device to acquire a system information (SI) of a third cell (cell3) on a third carrier frequency (F3) during a time period (T1);
  determining a minimum number of uplink feedback signals in the first cell (cell1) that a wireless device transmits in response to receiving downlink data in the first cell (cell1), wherein the minimum number of uplink feedback signals in the first cell (cell1) is dependent on whether SRS switching occurs.

Embodiment 13

The method of embodiment 12, further comprising: transmitting downlink data to the wireless device during T1 in the first cell (cell1).

Embodiment 14

The method of embodiment 12 or 13, further comprising: receiving the minimum number of uplink feedback signals from the wireless device in the first cell (cell1) in response to transmitting data to the wireless device.

Embodiment 15

The method of embodiment 12-14, wherein determining the need for SRS carrier based switching further comprises configuring the wireless device for SRS carrier based switching.

Embodiment 16

The method of embodiment 12, wherein determining the need for a wireless device to acquire a system information (SI) further comprises configuring the UE to acquire the SI and/or providing SRS transmission configuration information.

Embodiment 17

The method of embodiments 12-16, wherein the minimum number of uplink feedback signals in the first cell if SRS switching do not occur (N1) in, or between, any of cell1 and cell2 is larger than the minimum number of uplink feedback signals in the first cell if SRS switching occurs (N2) in, or between, any of cell1 and cell2.

Embodiment 18

A network node, connectable to a wireless device in wireless communication network, for system information, SI, handling during sounding reference signals, SRS, carrier based switching, the network node comprising: radio transceiver circuitry configured to send signals to the wireless communication network and to receive signals from the wireless communication network; and processing circuitry operatively associated with the radio transceiver circuitry and configured to:
  determine a need for a wireless device for SRS carrier based switching from a first cell (cell1) operating on a first carrier frequency (F1) to a second cell (cell2) operating on a second carrier frequency (F2);
  determine the need for a wireless device to acquire a system information (SI) of a third cell (cell3) on a third carrier frequency (F3) during a time period (T1);
  determine a minimum number of uplink feedback signals in the first cell (cell1) that a wireless device transmits in response to receiving downlink data in the first cell (cell1), wherein the minimum number of uplink feedback signals in the first cell (cell1) is dependent on whether SRS switching occurs.

Embodiment 19

The network node of embodiment 18 further configured to perform the steps of any of method embodiments 12-17.

Embodiment 20

A computer program product comprising program code portions to perform the steps of any of the preceding method embodiments when the computer program product is executed on one or more processing devices.

Embodiment 21

The computer program product of embodiment 12, stored on one or more computer-readable recording media.

APPENDIX 1.1 Proposed Changes to the Standard

The following sections can be modified in 3GPP TS 36.133 v14.1.0. The new changes are shaded in yellow text in the following sections in 3GPP TS 36.133 v14.1.0:

8.1.2.2.4 E-UTRAN TDD Intra Frequency Measurements with Autonomous Gaps 8.1.2.2.4.1 Identification of a New CGI of E-UTRA Cell with Autonomous Gaps No explicit neighbour list is provided to the UE for identifying a new CGI of E-UTRA cell. The UE shall identify and report the CGI when requested by the network for the purpose 'reportCGI'. The UE may make autonomous gaps in downlink reception and uplink transmission for receiving MIB and SIB1 messages according to clause 5.5.3.1 of TS 36.331 [2]. Note that a UE is not required to use autonomous gap if si-RequestForHO is set to false. If autonomous gaps are used for measurement with the purpose of 'reportCGI', regardless of whether DRX or eDRX_CONN is used or not, or whether SCell(s) are configured or not, the UE shall be able to identify a new CGI of E-UTRA cell within:

$$T_{identify\_CGI,intra} = T_{basic\_identify\_CGI,intra} \text{ ms}$$

Where $T_{basic\_identify\_CGI,intra} = 150$ ms. This is the time period used in the above equation where the maximum allowed time for the UE to identify a new CGI of an E-UTRA cell is defined, provided that the E-UTRA cell has been already identified by the UE.

A cell shall be considered identifiable when the following conditions are fulfilled:
  RSRP related side conditions given in Clause 9.1 are fulfilled for a corresponding Band,
  SCH_RP and SCH Ês/Iot according to Annex B.2.2 for a corresponding Band The MIB of an E-UTRA cell whose CGI is identified shall be considered decodable by the UE provided the PBCH demodulation requirements are met according to [5].

The requirement for identifying a new CGI of an E-UTRA cell within $T_{basic\_identify\_CGI,intra}$ is applicable when no DRX is used as well as when any of the DRX or eDRX_CONN cycles specified in TS 36.331 [2] is used.

Within the time, $T_{identify\_CGI,intra}$ ms, over which the UE identifies the new CGI of E-UTRA cell, the UE shall be able to transmit at least the number of ACK/NACKs stated in Table 8.1.2.2.4.1-1 on PCell or each of activated SCell(s), provided that:
  there is continuous DL data allocation,
  no DRX and no eDRX_CONN cycle is used,
  no measurement gaps are configured,
  only one code word is transmitted in each subframe,
  no MBSFN subframes are configured in the PCell or each of activated SCell(s).

TABLE 8.1.2.2.4.1-1

Requirement on minimum number of ACK/NACKs to transmit during $T_{basic\_identify\_CGI,intra}$:

| UL/DL configuration | Minimum number of transmitted ACK/NACKs | |
|---|---|---|
| 0 (Note 1) | — | 18 |
| 1 | — | 35 |
| 2 | — | 43 |
| 3 | — | 36 |
| 4 | — | 39 |
| 5 | — | 42 |
| 6 | — | 30 |

Note 1:
When a UE is configured with EIMTA-MainConfigServCell via RRC signalling [2] only this requirement shall apply.

For the UE capable of SRS carrier based switching when configured to perform SRS carrier based switching:
   the requirements defined in this section shall be met provided during $T_{identify\_CGI,intra}$:
      the SRS carrier based switching does not cause any interruption on the PCell or on any activated SCell during and
      DL subframe #0 and DL subframe #5 per radio frame of the target E-UTRA are available at the UE.
   otherwise the time to acquire the new CGI of the E-UTRA cell may be extended or the UE may not be able to transmit at least the number of ACK/NACKs as specified in Table 8.1.2.2.4.1-1 on PCell or each of the activated SCell(s).

8.1.2.3.7 E-UTRAN TDD-TDD Inter Frequency Measurements with Autonomous Gaps 8.1.2.3.7.1 Identification of a New CGI of E-UTRA TDD Cell with Autonomous Gaps No explicit neighbour list is provided to the UE for identifying a new CGI of E-UTRA cell. The UE shall identify and report the CGI when requested by the network for the purpose of 'reportCGI'. The UE may make autonomous gaps in both downlink reception and uplink transmission for receiving MIB and SIB1 message according to clause 5.5.3.1 of TS 36.331 [2]. Note that a UE is not required to use autonomous gap if si-RequestForHO is set to false. If autonomous gaps are used for measurement with the purpose of 'reportCGI', regardless of whether DRX or eDRX_CONN is used or not, or whether SCell(s) are configured or not, the UE shall be able to identify a new CGI of E-UTRA cell within:

$$T_{identify\_CGI,inter} = T_{basic\_identify\_CGI,inter} \text{ ms}$$

Where $T_{basic\_identify\_CGI,inter}$ =150 ms. This is the time period used in the above equation where the maximum allowed time for the UE to identify a new CGI of E-UTRA cell is defined, provided that the E-UTRA cell has been already identified by the UE.

A cell shall be considered identifiable following conditions are fulfilled:
   RSRP related side conditions given in Clause 9.1 are fulfilled for a corresponding Band,
   SCH_RP and SCH Ês/Iot according to Annex B.2.4 for a corresponding Band.

The MIB of an E-UTRA cell whose CGI is identified shall be considered decodable by the UE provided the PBCH demodulation requirements are met according to [5].

The requirement for identifying a new CGI of an E-UTRA cell within $T_{basic\_identify\_CGI,inter}$ is applicable when no DRX is used as well as when any of the DRX or eDRX_CONN cycles specified in TS 36.331 [2] is used.

Within the time, $T_{identify\_CGI,inter}$ ms, over which the UE identifies the new CGI of E-UTRA cell, the UE shall be able to transmit at least the number of ACK/NACKs stated in Table 8.1.2.3.7.1-1 on PCell or each of activated SCell(s), provided that:
   there is continuous DL data allocation,
   no DRX and no eDRX_CONN cycle is used,
   no measurement gaps are configured,
   only one code word is transmitted in each subframe,
   no MBSFN subframes are configured in the PCell or each of activated SCell(s).

TABLE 8.1.2.3.7.1-1

Requirement on minimum number of ACK/NACKs to transmit during $T_{basic\_identify\_CGI,inter}$:

| TDD UL/DL configuration for serving cell | Minimum number of transmitted ACK/NACKs | |
|---|---|---|
| 0 (Note 1) | — | 18 |
| 1 | — | 30 |

Note 1:
When a UE is configured with EIMTA-MainConfigServCell via RRC signalling [2] only this requirement shall apply cell.
Note 2:
The requirement for other TDD UL/DL confiauration is TBD.

For the UE capable of SRS carrier based switching when configured to perform SRS carrier based switching:
   the requirements defined in this section shall be met provided during $T_{identify\_CGI,inter}$:
      the SRS carrier based switching does not cause any interruption on the PCell or on any activated SCell during and
      DL subframe #0 and DL subframe #5 per radio frame of the target E-UTRA are available at the UE.
   otherwise the time to acquire the new CGI of the E-UTRA cell may be extended or the UE may not be able to transmit at least the number of ACK/NACKs as specified in Table 8.1.2.3.7.1-1 on PCell or each of the activated SCell(s).

The invention claimed is:

1. A method for a wireless device for acquiring system information (SI) during sounding reference signals (SRS) carrier based switching, the method comprising:
   determining a need for performing SRS carrier based switching from a first cell operating on a first carrier frequency, to a second cell operating on a second carrier frequency;
   acquiring a SI of a third cell on a third carrier frequency during a time period (T1); and
   transmitting a minimum number of uplink feedback signals in the first cell in response to receiving downlink data in the first cell, wherein the minimum number of uplink feedback signals in the first cell is dependent on whether SRS switching causes interruption on first cell.

2. The method of claim 1, wherein the determining the need for performing SRS carrier based switching is based on a configuration received from a network node.

3. The method of claim 1, wherein the wireless device creates autonomous gaps in at least one cell to acquire the SI of the third cell during the time period T1.

4. The method of claim 1, wherein the minimum number of uplink feedback signals in the first cell if SRS switching does not cause interruption on the first cell is larger than the minimum number of uplink feedback signals in the first cell if SRS switching causes interruption on first cell.

5. The method of claim 1, wherein the minimum number of uplink feedback signal comprises a number of ACK/NACKs.

6. The method of claim 1, further comprising adapting the SRS carrier based switching so as to ensure that the wireless device acquires the SI of the third cell during time period T1.

7. The method of claim 6, wherein the adapting SRS carrier based switching comprises receiving at least downlink (DL) time resources that contain the SI of the third cell during time period T1.

8. The method of claim 7, wherein DL time resources that contain the SI of the third cell during time period T1 comprises DL subframe #0, which contains Master Information Block (MIB), and DL subframe #5, which contains System Information Block SIB1.

9. The method of claim 1, wherein the time period T1 is dependent on whether SRS switching causes interruption on the first cell.

10. A wireless device configured for operation in a wireless communication network comprising at least a network node, a first cell, a second cell, and a third cell; the wireless device configured for acquiring system information (SI) during sounding reference signals (SRS) carrier based switching, the wireless device comprising:
radio transceiver circuitry configured to send signals to the wireless communication network and to receive signals from the wireless communication network; and
processing circuitry operatively associated with the radio transceiver circuitry and configured to:
determine a need for performing SRS carrier based switching from a first cell operating on a first carrier frequency, to a second cell operating on a second carrier frequency;
acquire SI of a third cell on a third carrier frequency during a time period T1; and
transmit a minimum number of uplink feedback signals in the first cell in response to receiving downlink data in the first cell, wherein the minimum number of uplink feedback signals in the first cell is dependent on whether SRS switching causes interruption on first cell.

11. A method for a network node, connected to a wireless device in wireless communication network, for system information (SI) handling during sounding reference signals (SRS) carrier based switching, the method comprising:
determining a need for a wireless device for performing SRS carrier based switching from a first cell operating on a first carrier frequency, to a second cell operating on a second carrier frequency;
determining the need for a wireless device to acquire SI of a third cell on a third carrier frequency during a time period T1; and
determining a minimum number of uplink feedback signals in the first cell that a wireless device transmits in response to receiving downlink data in the first cell, wherein the minimum number of uplink feedback signals in the first cell is dependent on whether SRS switching causes interruption on the first cell.

12. The method of claim 11, further comprising transmitting downlink data to the wireless device during time period T1 in the first cell.

13. The method of claim 11, further comprising receiving the minimum number of uplink feedback signals from the wireless device in the first cell in response to transmitting data to the wireless device.

14. The method of claim 11, wherein the determining the need for performing SRS carrier based switching comprises configuring the wireless device for SRS carrier based switching.

15. The method of claim 11, wherein the determining the need for a wireless device to acquire the SI of the third cell comprises configuring the UE to acquire the SI and/or providing SRS transmission configuration information.

16. The method of claim 11, wherein the minimum number of uplink feedback signals in the first cell if SRS switching does not cause interruption on the first cell is larger than the minimum number of uplink feedback signals in the first cell if SRS switching causes interruption on the first cell.

17. A network node, connectable to a wireless device in wireless communication network, the network node configured for system information (SI) handling during sounding reference signals (SRS) carrier based switching, the network node comprising:
radio transceiver circuitry configured to send signals to the wireless communication network and to receive signals from the wireless communication network; and
processing circuitry operatively associated with the radio transceiver circuitry and configured to:
determine a need for a wireless device for performing SRS carrier based switching from a first cell operating on a first carrier frequency, to a second cell operating on a second carrier frequency;
determine the need for a wireless device to acquire SI of a third cell on a third carrier frequency during a time period T1; and
determine a minimum number of uplink feedback signals in the first cell that a wireless device transmits in response to receiving downlink data in the first cell, wherein the minimum number of uplink feedback signals in the first cell is dependent on whether SRS switching causes interruption on first cell.

* * * * *